(No Model.)
F. A. ALBERT.
TOOL HANDLE.
No. 471,456.  Patented Mar. 22, 1892.
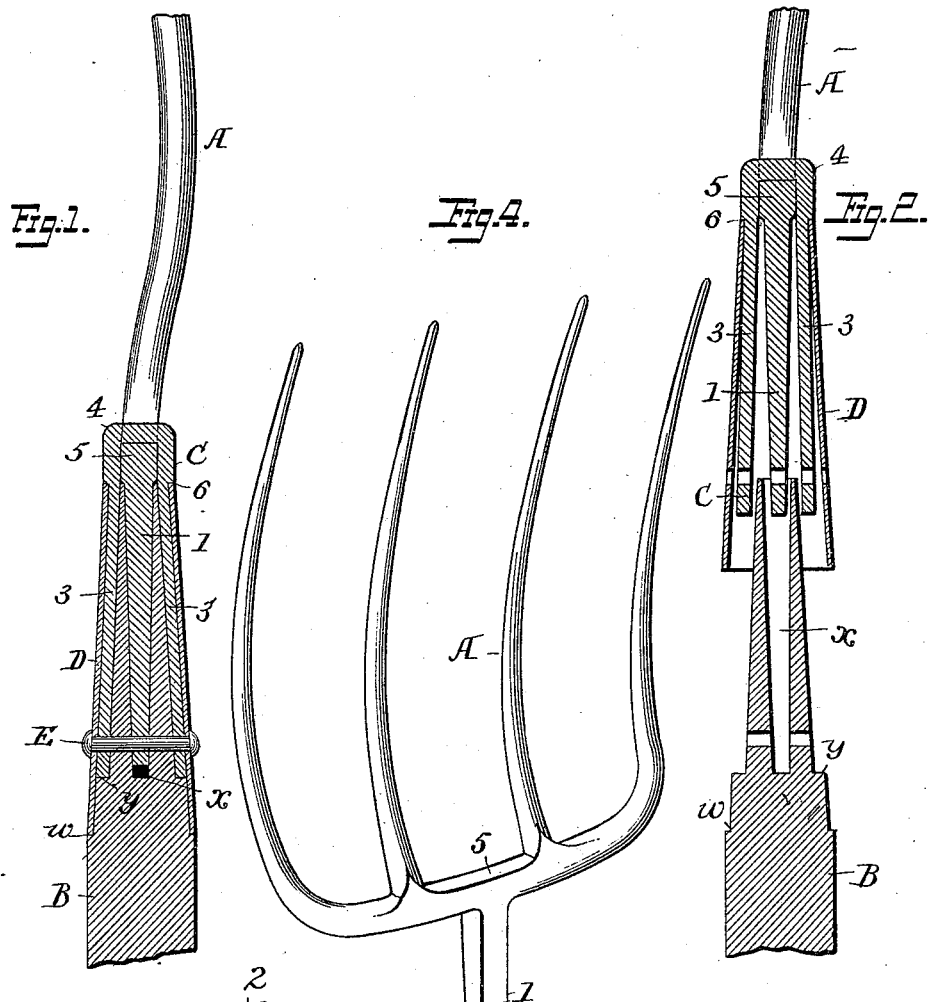
Witnesses
Jno. G. Hinkel.
H. S. McArthur.
Inventor
Francis A. Albert.
By Foster Freeman
Attorneys

UNITED STATES PATENT OFFICE.

FRANCIS A. ALBERT, OF BALTIMORE, MARYLAND.

TOOL-HANDLE.

SPECIFICATION forming part of Letters Patent No. 471,456, dated March 22, 1892.

Application filed November 11, 1891. Serial No. 411,616. (No model.)

*To all whom it may concern:*

Be it known that I, FRANCIS A. ALBERT, a citizen of the United States, residing at Baltimore, Maryland, have invented certain new and useful Improvements in Tool-Handles, of which the following is a specification.

My invention relates to means for connecting tools to handles, adapted more especially for forks, rakes, picks, &c.; and it consists in constructing the parts as fully set forth hereinafter, and as illustrated in the accompanying drawings, in which—

Figure 1 is a sectional view illustrating my improvement as applied to a pitchfork. Fig. 2 is a sectional view illustrating the method of connecting the parts together. Figs. 3, 4, and 5 are perspective views of the parts detached.

The fork or other implement A is provided with a tang 1, and the staff or handle B is provided with a socket $x$ to receive the said tang, and the portion of the handle adjacent to the socket is cut away to form two flat faces 2 2, which are inclined toward each other, so that the socketed portion of the handle is somewhat tapering, the cutting away of the handle forming two shoulders $y$ $y$, and below these shoulders the handle is enlarged, forming an annular shoulder $w$. To the faces 2 2 of the handle are fitted the branches 3 3 of a yoke C, the said branches 3 being normally parallel to each other, but being spread by the act of forcing them onto the tapering end of the handle, and when in position the head 4 of the yoke extends over or straddles the cross-bar 5 of the implement. The head 4 is formed so as to provide two shoulders 6 6, between which and the shoulder $w$ of the handle is a hollow tapering ferrule D, that incloses the branches 3 3 and the tapering end of the handle, as shown in Fig. 1, and when in this position a cross bolt or nut or rivet E, extending through the ferrule, the branches 3 3, and the end of the handle, and through the tang, all of which are provided with coinciding openings, serves to secure all the parts in place.

It will be seen that the end of the handle, the branches 3 3, and the ferrule are all tapering to about the same extent when the parts are in the position shown in Fig. 1, so that so long as the ferrule is contained in place the yoke cannot be withdrawn, but that the strain is prevented from pulling upon the yoke by extending the cross-pin E through the opening in the tang. It will further be seen that the ferrule, fitting against the shoulders 6, is forced onto the handle, so as to grip the parts together more firmly and prevent any tendency of the handle to slip whenever there is any blow upon the end of the yoke.

In putting the parts together the yoke is placed upon the tool and the ferrule is slipped upon the branches 3 3 and the handle is brought into the position shown in Fig. 2, after which the handle is driven into the yoke, thereby spreading the branches and bringing the parts to the position shown in Fig. 1, when they are connected by the cross-pin.

It will be seen that in the above-set-forth construction the only part of special construction or manufacture is the yoke C, the ferrule being of ordinary form and the handle differing only from ordinary handles in the particular arrangement of the faces and shoulders.

Without limiting myself to the precise construction and arrangement of parts shown and described, I claim—

1. The combination of a tool A, having a perforated tang 1, a handle having a tapered end with a central socket and flat side faces, a yoke embracing a cross-bar of the tool and having branches fitted to said side faces, a tapering ferrule inclosing the end of the handle and the branches of the yoke, and a cross-pin extending through openings in the ferrule, handle, branches, and tang, substantially as described.

2. The combination of the socketed tapering handle having flat faces 2 2 and shoulder $w$, a tool having a tang 1, adapted to the socket in the handle, a yoke embracing a cross-bar of the tool and having branches adapted to the faces of the handle and shoulders 6 6, a ferrule adapted to fit between the shoulders 6 and $w$, and a cross-pin E, passing through the ferrule, branches, handle, and tang, substantially as set forth.

In testimony whereof I have signed my name to this specification in the presence of two subscribing witnesses.

FRANCIS A. ALBERT.

Witnesses:
FRANCIS ALBERT,
R. F. GARDNER.